United States Patent [19]

Aeschbach

[11] Patent Number: 5,473,963
[45] Date of Patent: Dec. 12, 1995

[54] MAGNETIC BICYCLE PEDAL FOOT RETAINER

[76] Inventor: James F. Aeschbach, 1602 Cypress Trail, Middleton, Wis. 53562

[21] Appl. No.: 341,364

[22] Filed: Nov. 17, 1994

[51] Int. Cl.[6] .............................. G05G 1/14; A43B 5/14
[52] U.S. Cl. ........................................ 74/594.6; 36/131
[58] Field of Search ................... 74/594.6; 403/DIG. 1; 36/131

[56] References Cited

U.S. PATENT DOCUMENTS

| | | | |
|---|---|---|---|
| 550,409 | 11/1895 | Hanson . | |
| 588,038 | 8/1897 | Tudor . | |
| 4,103,563 | 8/1978 | Genzling | 74/594.5 |
| 5,170,574 | 12/1992 | Weisbrich | 36/131 |

FOREIGN PATENT DOCUMENTS 3243488  10/1991  Japan .................................... 74/594.6

Primary Examiner—Charles A. Marmor
Assistant Examiner—Mary Ann Battista
Attorney, Agent, or Firm—Lathrop & Clark

[57] ABSTRACT

A bicycling shoe has a ferromagnetic backing plate positionably connected to its sole. A nonmagnetic support plate has a plurality of through holes, and is fixed to the backing plate. NdFeB magnets of alternating polarity are attached by epoxy to the sidewalls of the through holes and make magnetic contact with the backing plate. A similar backing plate, support plate and alternating polarity magnet assembly is fixed to a bicycle pedal. A post extends from the pedal to position the shoe laterally. When the shoe is in a pedaling position, the polarity of the pedal magnets is opposite to the polarity of the shoe magnets, and the shoe is gripped to the pedal to permit transmission of power on the up stroke. To disengage, the shoe is rotated about the post, until like magnets are brought into opposition and the shoe is ejected from its position on the pedal.

24 Claims, 3 Drawing Sheets

MAGNETIC BICYCLE PEDAL FOOT RETAINER

FIELD OF THE INVENTION

The present invention relates to bicycles and bicycling accessories in general, and to apparatus for releasably connecting a bicyclist's shoes to the bicycle pedals in particular.

BACKGROUND OF THE INVENTION

For over a century the bicycle has served as a low cost form of transportation, a children's toy, a recreational pursuit, and an object of sporting achievement. The conventional bicycle features two pedals mounted to a rotating drive sprocket, which engages a chain which drives the bicycle rear wheel. Since the early days of bicycles, specialized mechanisms have been employed to allow a rider to supply force to both pedals in both the down stroke and the up stroke of the rider's legs.

One approach to achieving this connection has been to connect a harness or clip to each pedal into which a conventional shoe may be inserted. These clips have the advantage that they do not require specialized bicycling shoes. On the other hand, unless the clips are strapped or fastened to the shoe, they may not be entirely effective in transmitting force on the up stroke.

To provide a better connection, mechanical systems requiring modifications to the bicycling shoe have been developed. These systems typically have a projection or recess in the shoe sole which achieves an interlocking fit with structure on the bicycle pedal. However, to achieve effective gripping connection, these systems may require a compound movement or a strong effort to release the shoe from the pedal, which may not necessarily be intuitive or rapidly executable. Furthermore, when exposed to dirt, mud, and road conditions, these mechanical connections can become contaminated, with a resultant deterioration in performance. In addition, a clip which protrudes from the sole will tend to inhibit walking in the shoe when the rider has dismounted the bicycle.

In bicycle touring, the ability to instantly release the foot from the pedal is imperative for safety reasons. For example, a change in road conditions or an obstruction may require the bicyclist to stop suddenly. A stopped cyclist must balance himself with one foot on the ground, or face upset of the bicycle.

In recent times the bicycle hobby has expanded to include bicycle touring and racing on poorly paved or unpaved venues. Ruggedly constructed bicycles, sometimes known as "mountain bikes," are used on back roads or off road, and feature impact resistant frames and wider tires. Riding off smooth pavement calls for frequent release of the foot from the pedal, for shift balance on turns or around obstacles.

What is needed is a system for attaching the bicyclist's feet to the pedals in an effective manner for force transmission on the upward stroke which is at the same time easily and intuitively disconnectable.

SUMMARY OF THE INVENTION

The bicycle pedal, bicycling shoe arrangement of this invention has a bicycling shoe with a circular ferromagnetic backing plate positionably connected to its sole. A circular nonmagnetic support plate has a plurality of through holes, and is fixed to the backing plate. NdFeB magnets of alternating polarity are attached by epoxy to the sidewalls of the through holes and make magnetic contact with the backing plate. A similar backing plate, support plate and alternating polarity magnet assembly is fixed to a bicycle pedal. A post extends from the pedal backing plate and engages with an opening formed in the shoe backing plate and support plate to position the shoe laterally. When the shoe is in a pedaling position, the polarity of the pedal magnets is opposite to the polarity of the shoe magnets, and the shoe is gripped to the pedal to permit transmission of power on the up stroke. To disengage, the shoe is rotated about the post, until like magnets are brought into opposition and the shoe is ejected from its position on the pedal. The magnets may be circular or sector shaped, and various arrangements of magnets may be employed to achieve a gripping force of 60 pounds or greater.

It is an object of the present invention to provide a bicycle shoe and pedal assembly which allows the application of pedaling force on the upstroke.

It is also an object of the present invention to provide a bicycle shoe and pedal assembly which are non-mechanically linked for rapid connection and release.

It is an additional object of the present invention to provide a bicycle shoe and pedal assembly which has a strong vertical attachment force, but a minimal shear resistance force.

It is another object of the present invention to provide a bicycle shoe which makes secure engagement with a specialized bicycle pedal, but which permits walking in the shoe.

Further objects, features and advantages of the invention will be apparent from the following detailed description when taken in conjunction with the accompanying drawings.

BRIEF DESCRIPTION OF THE DRAWINGS

FIG. IA is a perspective view of a bicyclist employing the bicycling shoes and pedals of this invention, wherein both shoes are magnetically engaged with the pedals for maximum application of pedaling force.

DESCRIPTION OF THE PREFERRED EMBODIMENT

Figures 1, 2, 3:
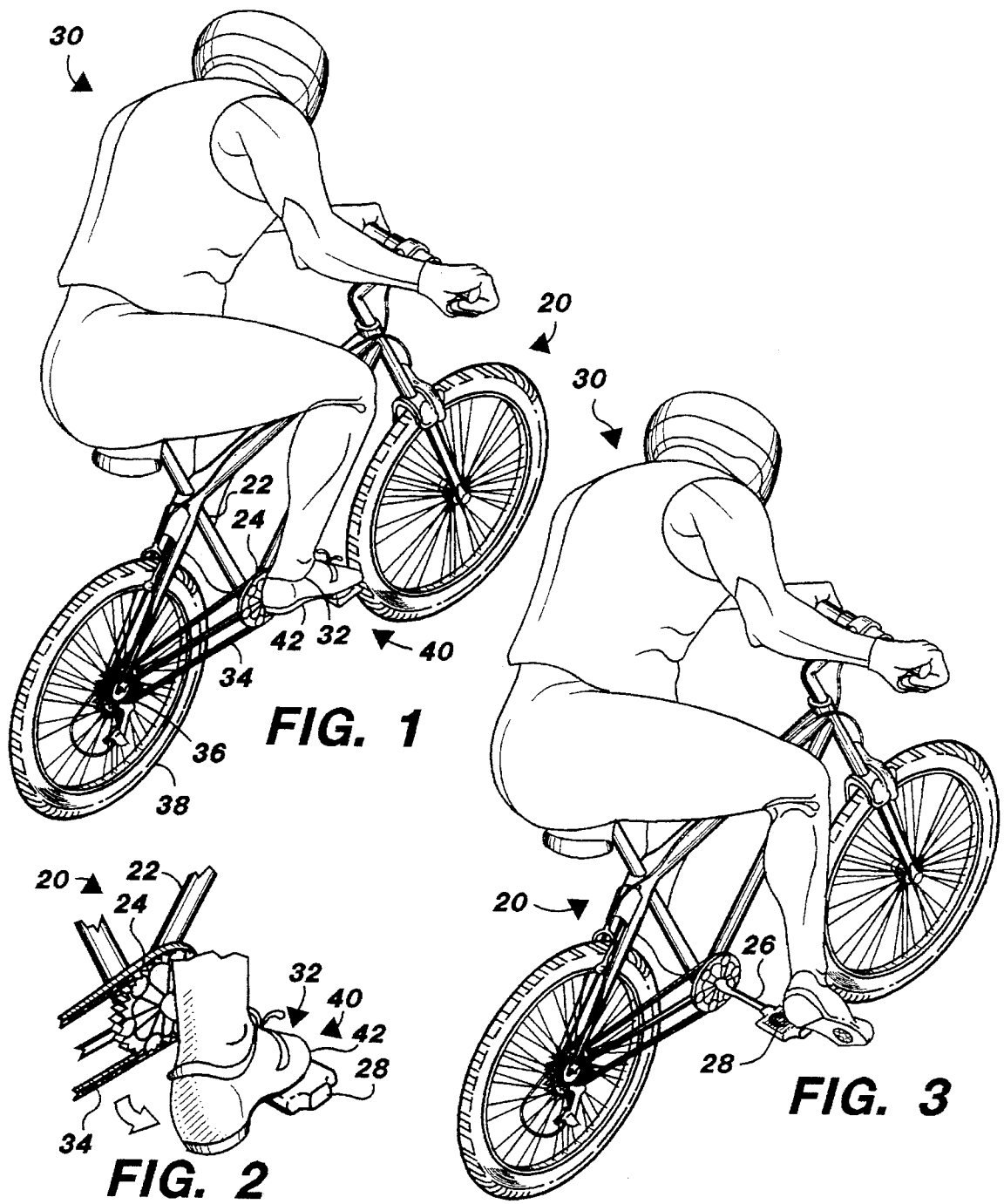
FIG. 2 is a fragmentary perspective view of the shoe of FIG. 1 being rotated for release from the pedal of FIG. 1.
FIG. 3 is a perspective view of the bicyclist of FIG. 1 with a shoe released from the pedal for assistance in bicycle maneuvering.

Referring more particularly to FIGS. 1–7, wherein like numbers refer to similar parts, a conventional bicycle 20 is shown in FIGS. 1 and 3. The bicycle 20 has a frame 22 and a drive sprocket 24 rotatably mounted to the frame. Pedal arms 26 extend radially outwardly from the drive sprocket 24 and support two pedals 28, one on each side of the frame 22.

A bicyclist 30 mounts the frame and places his feet 32 on the pedals 28 and advances the pedals in an up and down pattern to rotate the drive sprocket 24 which is connected by a chain 34 to the gear assembly 36 on the rear wheel 38 of the bicycle 20.

Figure 4:
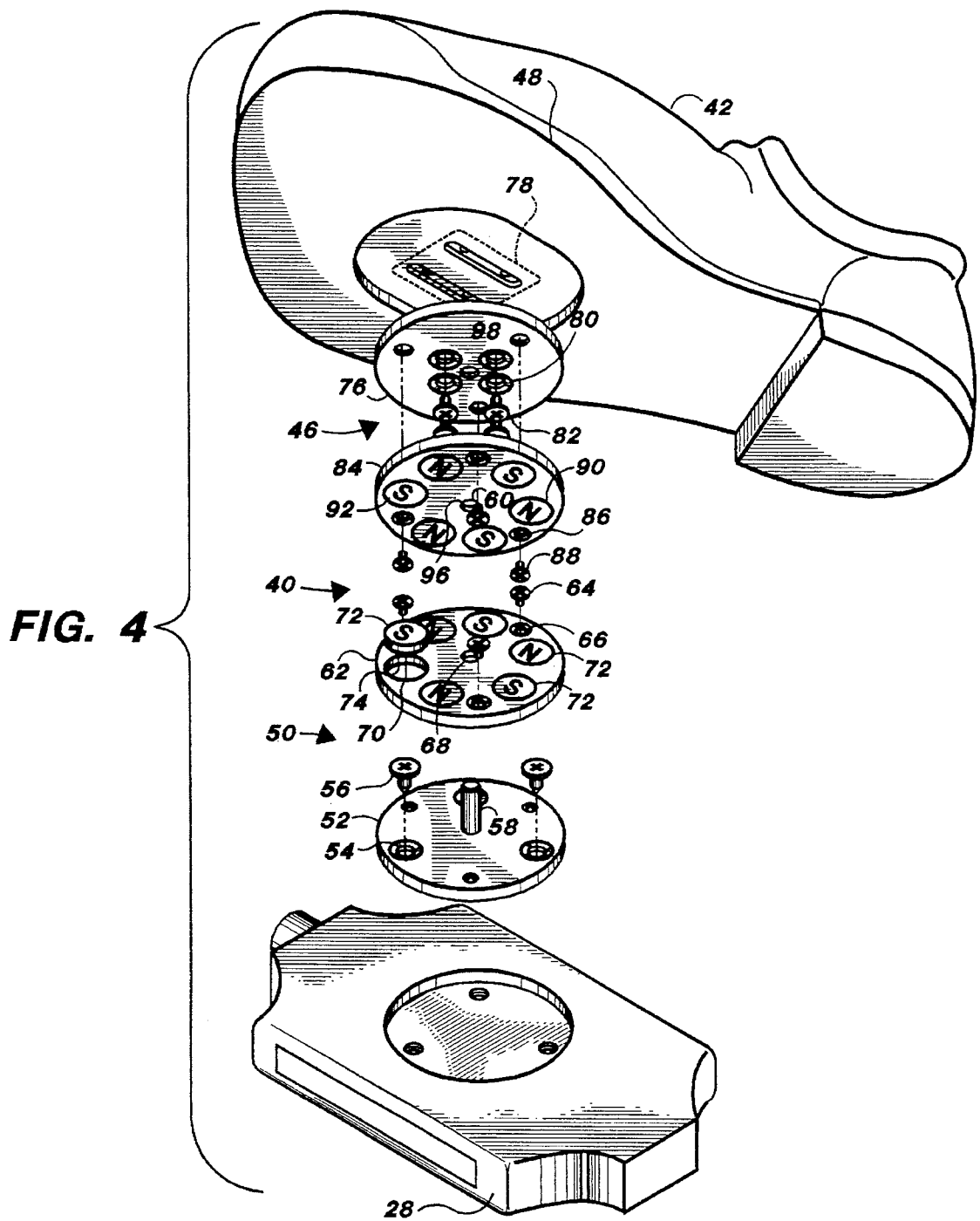
FIG. 4 is an exploded isometric view of the shoe and pedal assembly of FIG. 1.

The present invention provides a mechanism for attaching a wearer's shoes to a sporting device such as to the pedals of a bicycle. As shown in FIG. 4, the assembly 40 for connecting the bicyclist's shoe 42 to the bicycle pedal 28 has two modules, a shoe module 46 mounted to the sole 48 of the bicycling shoe 42, and a pedal module 50 mounted to the bicycle pedal 28. The modules 46, 50 are fabricated to selectably exert an attractive magnetic force between each other when opposite poles are positioned one over another, and to be rotatable to repel one another when like poles are positioned one over the other. Each module has a plurality or magnetic regions of opposite polarity, and the two modules face each other such that when the modules are positioned in pedaling position opposite magnetic regions face one another, and when the modules are rotated, like magnetic regions face one another.

The pedal module 50 has a backing plate 52 which is formed of a ferromagnetic material, preferably 1018 steel with electroless nickel plating. A corrosion-resistant material such as 400 series stainless steel may also be employed for the backing plate. The backing plate 52 has three countersunk fastener holes 54 through which extend fasteners 56, for example 5 mm ×8 mm FHP screws. The fasteners 56 fix the backing plate 52 to the pedal 28. A centering post 58 extends upwardly from the backing plate 52, and is positioned at the center of the circular backing plate 52. The centering post engages with a receptor cavity 60 in the shoe module 46, and serves to restrain lateral and tilt movement of the shoe with respect to the pedal.

A nonmagnetic support plate 62 is connected by fasteners 64, for example 3 mm ×6 mm FHP screws, which extend through countersunk fastener openings 66 into the backing plate 52. The support plate 62 may be formed of any nonmagnetic material including plastics, or carbon fiber composites, but is preferably formed of 6061-T6 Aluminum with electroless nickel plating. The support plate 62 has a central opening 68 which provides clearance for the backing plate post 58 to pass through.

Six cylindrical through holes 70 are formed in the support plate 62. The through holes are positioned equidistant from the central opening 68 and are positioned approximately 60 degrees from one another. A two pole cylindrical magnet 72 is fixed within each through hole 70, such that the bottom surface of each magnet 72 makes contact with the ferromagnetic backing plate 52. An epoxy resin adhesive, such as Loctite brand 680, 642, or 635 one part epoxy adhesive, is applied to the cylindrical side wall 74 of each through hole 70 and the cylindrical magnets 72 are thus held in place by adhesive connection to the support plate 62 only. The bottom surfaces of the magnets 72 are held in direct contact with the ferromagnetic material of the backing plate 52 without the interposition of adhesive therebetween. The magnets 72 are preferably formed of Neodymium Iron Boron (NdFeB). Alternatively, other high flux density magnets formed of materials such as Samarium Cobalt (SmCo) may be used. The six magnets are positioned with the two magnetic poles vertically aligned, and of alternating polarity. Thus a magnet 72 with its North pole extending upwardly is adjacent to a magnet with its South pole extending upwardly, and so on around the circle of the support plate. The magnets 72 preferably have electroless nickel plating. The plating prevents corrosion and also provides a hard wear-resistant surface.

The shoe module 46 is attached to a conventional bicycling shoe 42 such as a Shimano SPD brand bicycling shoe, from which the mechanical attachment member has been removed. Racing shoes may also be employed. The shoe module 46 has a ferromagnetic backing plate 76 which is connected to the sole 48 of the shoe 42. The backing plate 76 may be connected directly to the sole 48, or it may preferably be connected to a positionable plate 78, as shown in FIG. 4, which is slidable within the sole for positioning of the shoe module 46. The backing plate 76 has four centrally positioned countersunk attachment holes 80 through which fasteners 82 extend into the positionable plate 78. Tightening of the fasteners 82 grips portions of the shoe sole 48 therebetween and fixes the shoe module 46 in place.

A support plate 84 is formed of a nonmagnetic material, preferably aluminum, and has three countersunk fastener holes 86, through which fasteners 88, for example 3 mm ×6 mm FHP screws, extend to connect the support plate 84 to the backing plate 76. The support plate 84 has six cylindrical through holes 90 in which are mounted a plurality of cylindrical NdFeB magnets 92. The support plate 84 has a central hole 96, and the backing plate 76 has a central hole 98 aligned with the support plate central hole. The central holes 96, 98 receive the pedal module centering post 58.

As in the pedal module support plate, the magnets 92 of the shoe module support plate 84 are held in place by an epoxy adhesive applied between the magnet side walls and the side walls of the support plate through holes 90. The magnets 92 are also positioned with alternating polarity around the central hole 96.

Figure 6:
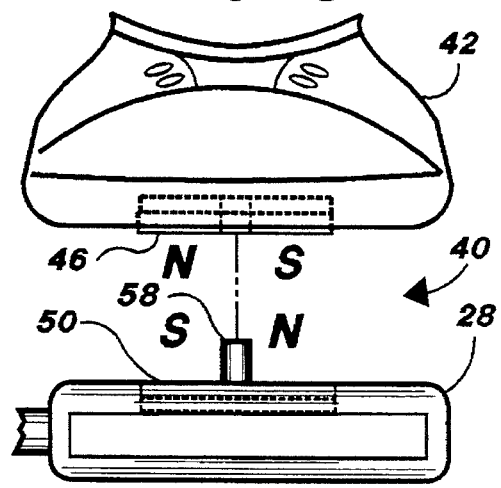
FIG. 6 is a front exploded schematic view of the shoe and pedal assembly of this invention.
Figure 7:
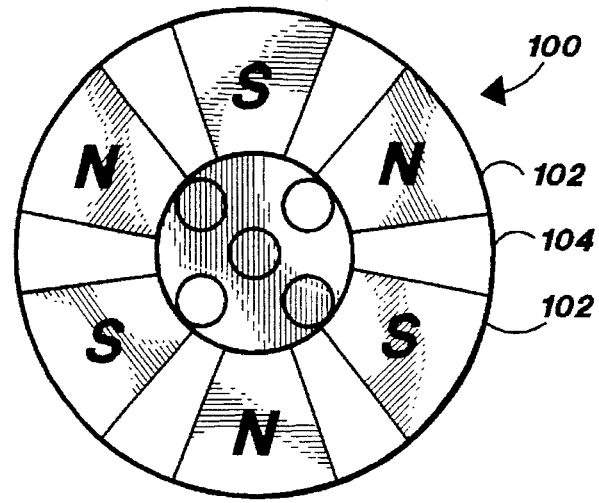
FIG. 7 is a bottom plan view of an alternative embodiment magnetic assembly insert of this invention employing sector-shaped magnets.

As shown in FIG. 6, the shoe module 46 is positioned over the pedal module 50 such that the North polarity magnets 92 of the shoe module are superposed over the South polarity magnets of the pedal module, in a like way the South polarity magnets of the shoe module are superposed over the North polarity magnets of the pedal module. The effect of this superposition is to cause the shoe module 46 to be attracted to and gripped by the pedal module. The force of this gripping is sufficient to permit force to be imparted to the bicycle drive sprocket 24 on the upstroke. The force exerted between the two modules may be estimated as follows:

$$F = 0.588B^2 \sqrt{A2L_m}$$

Where
F=Force in pounds
B=Residual flux density
A=Pole area in square inches
$L_m$=Individual magnet thickness in inches The magnets 72, 92 may be selected to achieve a desired magnetic attraction force between the modules. For example, selecting Type 35 NdFeB supplied by the Magnet Sales & Mfg. Co. of Culver City, Calif., which have a residual flux density of 12.300 Gauss, with six magnets of about 0.20 square inch surface area, and 0.125 inch thickness, a force of about 60 pounds will be developed. Smaller magnets may be useful in applications requiring less force, for example a 25 pound force would be acceptable for children. Sixty pounds force is considered desirable for the expected exertion of an adult bicyclist. In the illustrated embodiment magnets of 0.50 inches diameter are employed.

The ferromagnetic backing plates serve as magnetic shunts between the magnets, increasing the effective attraction between the pedal module and the shoe module.

Figure 5:
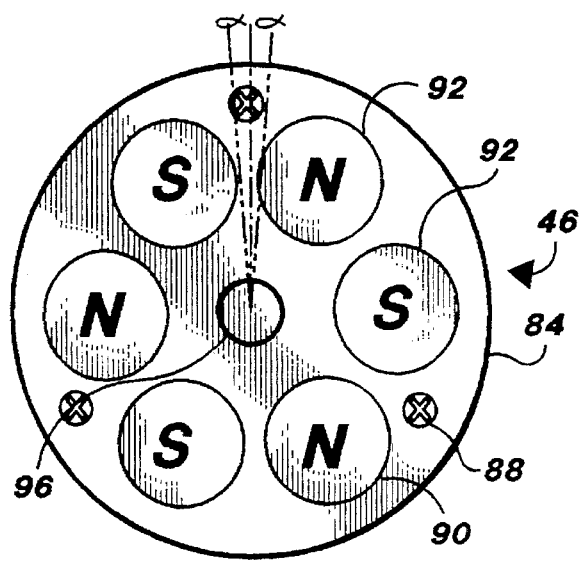
FIG. 5 is a bottom plan view of the magnetic assembly module for a shoe of FIG. 1.

As shown in FIG. 1, when a bicyclist is pedaling, the shoe modules retain the bicyclist's shoes engaged to the pedal modules on the pedals. The centering post prevents lateral displacement of the shoe with respect to a pedal. The assembly's resistance to separation forces is great, hence it is difficult or impossible for the rider to pull his feet free of the pedals. However, release from the pedals is simply achieved by rotating the foot, as shown in FIG. 2. As shown in FIG. 5, there is a play of about 11 degrees in which a rider may rotate his foot with respect to the pedal, that is about 5 ½ degrees in each direction, designated α in FIG. 5. A rotation of greater than this amount will cause like magnets to come into superposition, thereby developing a repelling force which is on the order of the attractive force previously encountered. The effect of this repelling force is to instantly eject the rider's foot from the pedal.

Because the shoe modules 46 do not protrude below the level of the shoe sole 48, the modules do not encumber ordinary walking. For protection of the magnets of the shoe module while walking, a circular ferromagnetic plate of the same diameter as the support plate 84, may be magnetically attached to the shoe module. The protective plate (not shown) may have a thin rubber coating thereon to reduce the clicking noise of the plate on pavement.

The individual magnets may be shapes other than cylinders. An alternative embodiment module 100, shown in FIG. 7, employs generally sector-shaped magnets 102. The sector-shaped magnets offer the advantage of greater surface area than a circle for a given angular section of the module, and hence greater attractive force for a given diameter support plate 104.

In addition, although individual magnets of different polarity supported in the support plate will provide the maximum attractive force, it may be desirable to form the support plate and the magnets as a unitary part, with separate polarity regions imposed on the ferromagnetic element. Such a unitary part may be of lower cost in large quantities.

It should be noted that the invention may also be used on other types of bicycles, such as recumbent bicycles, as well as tricycles, or to connect a wearer's shoes to other sporting devices such as snow skis, water skis, snow boards, and skate boards. In addition, although six magnets have been illustrated on each module, a greater or lesser number may be employed.

It is understood that the invention is not limited to the particular construction and arrangement of parts herein illustrated and described, but embraces such modified forms thereof as come within the scope of the following claims.

I claim:

1. An apparatus for selectably connecting a wearer's shoe to a sport device; the apparatus comprising:
   a) a first backing plate which is mountable to the shoe;
   b) a first support plate having portions which define a plurality of through holes, wherein the first support plate is connected beneath the first backing plate;
   c) a plurality of first magnets, positioned within said plurality of through holes of the first support plate to make contact with the first backing plate, wherein each one of said plurality of first magnets is of an opposite polarity from an adjacent one of said plurality of first magnets;
   d) a second backing plate which is mountable to the sport device;
   e) a second support plate having portions which define a plurality of through holes, wherein the second support plate is connected above the second backing plate; and
   f) a plurality of second magnets, positioned within said plurality of through holes of the second support plate to make contact with the second backing plate, wherein the polarity of each one of said plurality second magnets is opposite to the polarity of a superposed one of said plurality of first magnets when said shoe is positioned on said sport device, the second support plate being thereby connected to the first support plate, and wherein rotation of the first support plate with respect to the second support plate will rotate said plurality of first magnets so that the polarity of each one of said plurality of second magnets is the same as the polarity of a superposed one of said plurality of first magnets; for ejection of the shoe from the sport device.

2. The apparatus of claim 1 further comprising:
   a) a post which extends upwardly from the second backing plate; and
   b) portions of the first support plate defining an opening which receives the second plate post and positions the shoe with respect to the sport device to restrict lateral and tilting motion but to permit rotation of the first support plate with respect to the second support plate.

3. The apparatus of claim 1 wherein the first support plate and the second support plate are substantially circular, and wherein each one of the plurality of first and second magnet are positioned in one of the plurality of through holes of the first and second support plates respectively which is equidistant from the center of its respective said first or second support plate.

4. The apparatus of claim 3 wherein the plurality of first and second magnets are circular.

5. The apparatus of claim 3 wherein the plurality of first and second magnets are substantially sector shaped.

6. The apparatus of claim 1 wherein the plurality of first and second magnets are formed of a material selected from the group consisting of NdFeB and SmCo.

7. The apparatus of claim 1 wherein each one of the plurality of through holes of the first and second support plates has a sidewall, and wherein each one of the plurality of first and second magnets is fixed to support plate by an adhesive which extends between each said through hole sidewall and the magnet positioned therein, permitting the plurality of first and second magnets to make contact with their respective said first or second backing plates without the interposition of adhesive therebetween.

8. The apparatus of claim 1 wherein the force developed between the plurality of first magnets and the plurality of second magnets is at least 25 pounds.

9. The apparatus of claim 1 wherein the first and second backing plates are formed of a ferromagnetic material, and the first and second support plates are formed of a nonmagnetic material.

10. A bicycling assembly, comprising:
   a) a shoe having a sole;
   b) a shoe backing plate mounted to the sole of the shoe;
   c) a shoe support plate having portions which define a plurality of through holes, wherein the shoe support plate is connected to the shoe backing plate and is positioned beneath the shoe backing plate;
   d) a plurality of shoe magnets, positioned within said plurality of through holes of the shoe support plate to make contact with the shoe backing plate, wherein each one of said plurality of shoe magnets is of an opposite polarity from an adjacent one of said plurality of shoe magnets, the plurality of shoe magnets facing downwardly;

e) a bicycle pedal;

f) a pedal backing plate which is mounted to the pedal;

g) a pedal support plate having portions which define a plurality of through holes, wherein the pedal support plate is connected above the pedal backing plate; and h) a plurality of pedal magnets, positioned within said plurality of through holes of the pedal support plate to make contact with the pedal backing plate, wherein the polarity of each one of said plurality of pedal magnets is opposite to the polarity of a superposed one of said plurality of shoe magnets when said shoe is positioned on said pedal for bicycling, the pedal support plate being thereby connected to the shoe support plate, and wherein rotation of the shoe support plate with respect to the pedal support plate will rotate said plurality of shoe magnets so that the polarity of each one of said plurality of pedal magnets is the same as the polarity of a superposed one of said plurality of shoe magnets for ejection of the shoe from the pedal.

11. The assembly of claim 10 wherein the shoe backing plate is positionably mounted to the shoe.

12. The assembly of claim 10 further comprising:

a) a post which extends upwardly from the pedal backing plate; and b) portions of the shoe support plate defining an opening which receives the pedal plate post and positions the shoe with respect to the pedal to restrict lateral and tilting motion but to permit rotation of the shoe support plate with respect to the pedal support plate.

13. The assembly of claim 10 wherein the shoe support plate and the pedal support plate are substantially circular, and wherein each one of the plurality of shoe and pedal magnets are positioned in one of the plurality of through holes of the shoe and pedal support plates respectively to be equidistant from the center of its respective said shoe or pedal support plate.

14. The assembly of claim 13 wherein the plurality of shoe and pedal magnets are circular.

15. The assembly of claim 13 wherein the plurality of shoe and pedal magnets are substantially sector shaped.

16. The assembly of claim 10 wherein the plurality of shoe and pedal magnets are formed of a material selected from the group consisting of NdFeB and SmCo.

17. The assembly of claim 10 wherein each one of the plurality of through holes of the shoe and pedal support plates has a sidewall, and wherein each one of the plurality of shoe and pedal magnets is fixed to its respective said shoe or pedal support plate by an adhesive which extends between each said through hole sidewall and the magnet positioned therein, permitting the plurality of shoe and pedal magnets to make contact with their respective said shoe or pedal backing plates without the interposition of adhesive therebetween.

18. The assembly of claim 10 wherein the force developed between the plurality of shoe magnets and the plurality of pedal magnets is at least 25 pounds.

19. The assembly of claim 10 wherein the shoe and pedal backing plates are formed of a ferromagnetic material, and the shoe and pedal support plates are formed of a nonmagnetic material.

20. An apparatus connecting a bicyclist's shoe to a bicycle pedal, comprising:

a) a plurality of first magnets mounted to the shoe and facing downwardly, wherein the said plurality of first magnets are spaced equidistantly from a central point, and wherein at least one of the plurality of first magnets has a polarity opposite to at least one other of the plurality of first magnets; and b) a plurality of second magnets mounted to the bicycle pedal and facing upwardly, wherein said plurality of second magnets are spaced equidistantly from a central point, and wherein each one of said plurality of second magnets is opposite in polarity to the one of the plurality of first magnets positioned thereover on the shoe, such that when the shoe is superposed over the pedal, the shoe is gripped thereto, and such that when the shoe is rotated with respect to the pedal, each one of the plurality of first magnets is caused to be superposed over one of the plurality of second magnets of like polarity and the shoe is thereby ejected from the pedal.

21. The apparatus of claim 20 further comprising:

a) a first ferromagnetic plate in magnetic contact with all the plurality of first magnets and positioned above the plurality of first magnets; and b) a second ferromagnetic plate in magnetic contact with all the plurality of second magnets and positioned below the plurality of second magnets.

22. The apparatus of claim 20 further comprising a post projecting up from the central point from which the plurality of second magnets are spaced, wherein the post extends into engagement with the shoe to position the plurality of first magnets with respect to the plurality of second magnets.

23. A sporting assembly, comprising:

a) a shoe having a sole;

b) a shoe magnetic module which is fixed to the shoe to face downwardly, wherein the shoe magnetic module has a plurality of distinct magnetic regions facing downwardly, and wherein at least two of said plurality of magnetic regions are of opposite polarity;

c) a sporting device; and d) a device magnetic module which is fixed to the device, wherein the device magnetic module has a plurality of distinct magnetic regions facing upwardly, and wherein at least two of said plurality of magnetic regions are of opposite polarity; wherein the polarity of each one of the plurality of device magnetic regions is opposite to the polarity of a superposed one of the plurality of shoe magnetic regions when said shoe is positioned on said device, the shoe being thereby connected to the device, and wherein rotation of the shoe magnetic module with respect to the device magnetic module will cause each one of the plurality of shoe magnetic regions to be superposed over one of the plurality of device magnetic regions of like polarity for ejection of the shoe from the device.

24. The assembly of claim 23 further comprising:

a) a post which extends upwardly from one of said magnetic modules; and b) portions of the other of said magnetic modules defining an opening which receives the post and positions the shoe with respect to the device to restrict lateral and tilting motion but to permit rotation of the shoe magnetic module with respect to the device magnetic module.

\* \* \* \* \*

UNITED STATES PATENT AND TRADEMARK OFFICE
CERTIFICATE OF CORRECTION

PATENT NO. : 5,473,963
DATED : December 12, 1995
INVENTOR(S) : James F. Aeschbach It is certified that error appears in the above-identified patent and that said Letters Patent is hereby corrected as shown below:

In column 2, line 38, change "FIG. IA" to -- FIG. 1 --.

In column 4, line 57, change "12.300 Gauss" to -- 12,300 Gauss --.

In column 5, lines 10 and 11, change "is about ⁵ ½ degrees" to -- is about 5 ½ degrees --.

In column 6, line 13, change "of first magnets, for" to -- of first magnets for --.

In column 6, line 25, change "first and second magnet" to -- first and second magnets --.

In column 6, line 40, change "is fixed to support plate" to -- is fixed to its respective said first or second support plate --.

Signed and Sealed this

First Day of September, 1998

Attest:

BRUCE LEHMAN

*Attesting Officer*    Commissioner of Patents and Trademarks